(12) United States Patent
Nishidate (10) Patent No.: US 10,177,626 B2
(45) Date of Patent: Jan. 8, 2019

(54) BRUSHLESS MOTOR

(71) Applicant: Tokyo Parts Industrial Co., Ltd., Gunma-ken (JP)

(72) Inventor: Masahiro Nishidate, Gunma-ken (JP)

(73) Assignee: Tokyo Parts Industrial Co., Ltd. (JP)

( * ) Notice: Subject to any disclaimer, the term of this patent is extended or adjusted under 35 U.S.C. 154(b) by 274 days.

(21) Appl. No.: 15/335,710

(22) Filed: Oct. 27, 2016

(65) Prior Publication Data
US 2017/0179784 A1    Jun. 22, 2017

(30) Foreign Application Priority Data

Dec. 18, 2015  (JP) ................................. 2015-246885
Oct. 6, 2016   (JP) ................................. 2016-197840

(51) Int. Cl.
*H02K 1/27*     (2006.01)
*H02K 5/167*    (2006.01)
*H02K 7/08*     (2006.01)

(52) U.S. Cl.
CPC ............. *H02K 7/081* (2013.01); *H02K 7/083* (2013.01); *H02K 7/085* (2013.01)

(58) Field of Classification Search
CPC ........ H02K 1/2786; H02K 5/167; H02K 7/08; H02K 7/081; H02K 7/083; H02K 7/085
USPC .................................. 310/66, 89, 90, 156.01
See application file for complete search history.

(56) References Cited

U.S. PATENT DOCUMENTS 5,325,006 A * 6/1994 Uno .................... F16C 33/1035
                                                   310/156.04
5,357,163 A * 10/1994 Minakuchi ............ F16C 17/026
                                                   310/156.05
5,744,881 A * 4/1998 Ishizuka ............ G11B 19/2009
                                                   310/156.26

(Continued)

FOREIGN PATENT DOCUMENTS

JP          2532489         4/1997

OTHER PUBLICATIONS

English translation, JP 2532489 Y2, Matsushita Electric Industrial Company, translated on 2018.*

(Continued)

*Primary Examiner* — John K Kim
(74) *Attorney, Agent, or Firm* — Jordan and Koda, PLLC (57) ABSTRACT

A cover member has a cylinder in the center of a cover part. A second sliding bearing is fastened to the cylinder. A rotary shaft protrudes upward from the cylinder without contact with the second sliding bearing. A first sliding bearing is a main bearing, which can radially support the rotary shaft, and the second sliding bearing is an auxiliary bearing which, when the rotary shaft is subjected to a load from the radial direction, bears that load in the radial direction together with the first sliding bearing. When the angle of inclination of the rotary shaft in the first sliding bearing is not maximal, the rotary shaft is supported only by the first sliding bearing, without the rotary shaft contacting the inside of the second sliding bearing. The amount of deformation of the rotary shaft when a load is applied to the rotary shaft from the radial direction and the rotary shaft first makes contact with the second sliding bearing is in a range from 0 to the maximum elastic deformation.

7 Claims, 9 Drawing Sheets

(56) References Cited

U.S. PATENT DOCUMENTS

| | | | | |
|---|---|---|---|---|
| 5,793,136 | A  * | 8/1998 | Redzic | H02K 16/02 |
| | | | | 310/112 |
| 6,384,503 | B1 * | 5/2002 | Iwaki | H02K 1/2786 |
| | | | | 310/156.21 |
| 6,703,735 | B1 * | 3/2004 | Gabrys | F16C 32/0465 |
| | | | | 310/181 |
| 6,707,187 | B1 * | 3/2004 | Gabrys | H02K 7/025 |
| | | | | 310/74 |
| 6,727,616 | B1 * | 4/2004 | Gabrys | F16C 32/0402 |
| | | | | 310/90 |
| 6,794,777 | B1 * | 9/2004 | Fradella | F16C 32/0457 |
| | | | | 310/68 B |
| 7,264,430 | B2 * | 9/2007 | Bischof | B23B 5/36 |
| | | | | 310/90.5 |
| 2002/0047400 | A1 * | 4/2002 | Ueyama | H02K 7/09 |
| | | | | 310/90.5 |
| 2002/0121821 | A1 * | 9/2002 | Ritter | H02K 11/40 |
| | | | | 310/71 |
| 2011/0047561 | A1 * | 2/2011 | Hidaka | G11B 19/2009 |
| | | | | 720/695 |
| 2011/0158831 | A1 * | 6/2011 | Huang | F04D 29/058 |
| | | | | 417/410.1 |
| 2017/0141646 | A1 * | 5/2017 | Nishidate | H02K 5/1675 |
| 2017/0167537 | A1 * | 6/2017 | Tuchiya | F16C 33/104 |
| 2017/0179784 | A1 * | 6/2017 | Nishidate | H02K 7/081 |

OTHER PUBLICATIONS

U.S. Appl. No. 15/277,163, filed Sep. 27, 2016, Masahiro Nishidate.
U.S. Appl. No. 15/287,029, filed Oct. 6, 2016, Masahisa Tuchiya.
U.S. Appl. No. 15/286,926, filed Oct. 6, 2016, Masahiro Nishidate.

* cited by examiner

BRUSHLESS MOTOR

BACKGROUND OF THE INVENTION

The present invention relates to a brushless motor which can be used, for example, as an electric motor provided with a reduction mechanism for feeding paper money that has been inserted into a vending machine into a paper money transport path.

For example, Japanese Utility Model Registration Publication No. 2532489 describes a brushless motor covered by a frame (cover member). In this brushless motor an armature core (stator core) is fastened to the outside of an insulator (bearing holder), which is fastened to a printed circuit board (retaining plate), and a magnet (rotor magnet) that faces the outside of this armature core is fastened to the inner circumferential face of a rotor frame (rotor case). A rotary shaft that is fastened to the center of this rotor frame is supported by an oil-impregnated sintered bearing that is fastened to the center of the frame, and by an oil-impregnated sintered bearing that is fastened to the printed circuit board, and the top end of the rotary shaft protrudes from the frame.

However, with a structure such as described above, the rotary shaft is supported by an oil impregnated sintered bearing fastened to the center of the frame, and by an oil impregnated sintered bearing fastened to the printed circuit board, and thus these bearings can easily become misaligned. If these two bearings become misaligned, there are problems insomuch as, for example, abnormal wear of the bearings and the rotary shaft and twisting tend to occur, resulting in noise, and reducing the durability of the brushless motor.

While it is possible to limit misalignment between the two bearings by increasing the precision with which the frame and the printed circuit board are assembled, this will increase manufacturing costs.

Here, the problem of bearing misalignment can be eliminated, for example, by adopting a configuration in which the rotary shaft is supported by only one of the bearings. However, in the particular case in which the brushless motor is used as an electric motor provided with a reduction mechanism, there is a risk that the rotary shaft will be deformed if an excessive load from the radial direction is applied to the rotary shaft that protrudes from the frame (cover member).

SUMMARY OF THE INVENTION

The present invention is directed to providing a brushless motor that solves the aforementioned problems.

A first aspect of the present invention relating to a brushless motor comprises:

a bearing holder, which has a first cylindrical part and a bottom that closes the bottom end of the first cylindrical part;

a first sliding bearing fastened to an inner circumferential face of the first cylindrical part;

a rotary shaft supported so as to be able to rotate around the central axis of the first sliding bearing;

a rotor having a rotor case, which is fastened to the rotary shaft and has a second cylindrical part and a top plate that closes the top end of the second cylindrical part, and a rotor magnet fastened to a circumferential face of the second cylindrical part;

a stator, arranged so as to face the rotor magnet in the radial direction;

a retaining plate that extends radially outward from said bottom; and a cover member, which has a third cylindrical part and a cover part that closes the top end of the third cylindrical part, the bottom end of the third cylindrical part being fastened to the retaining plate, so as to cover the rotor and the stator; and a second sliding bearing, wherein, the cover member has a cylinder in the center of the cover part;

the second sliding bearing is fastened to the cylinder;

the rotary shaft protrudes upward from the cylinder;

the first sliding bearing is a main bearing;

the second sliding bearing is an auxiliary bearing which, when the rotary shaft is subjected to an excessive load from the radial direction, bears the load together with the first sliding bearing;

the rotary shaft is not in contact with the second sliding bearing in a state where the angle of inclination of the rotary shaft in the first sliding bearing is not maximal; and the amount of deformation of the rotary shaft when the rotary shaft receives an excessive load from the radial direction and the rotary shaft first makes contact with the second sliding bearing is in a range from 0 to the maximum elastic deformation.

In a second aspect of the present invention, the vertical length of the second sliding bearing 33 is shorter than the vertical length of the first sliding bearing 32.

In a third aspect of the present invention, the rotary shaft makes contact with the inside top end and inside bottom end of the first sliding bearing in a state where the angle of inclination of the rotary shaft is maximal.

In a fourth aspect of the present invention, the rotary shaft makes contact with the inside top end of the second sliding bearing when the rotary shaft is subjected to an excessive load from the radial direction.

In a fifth aspect of the present invention, a first washer member, which is made from a hard material and has a flat face, is fastened to the rotary shaft, between the top plate and the second sliding bearing; and the first washer member is disposed without contact with the top plate or the second sliding bearing.

In a sixth aspect of the present invention, a second washer member, which is made from a soft material and has a flat face, is provided on the rotary shaft, between the first washer member and the second sliding bearing; and the second washer member is disposed without contact with the second sliding bearing.

In a seventh aspect of the present invention, the rotor magnet is fastened to the inner circumferential face of the second cylindrical part;

the stator has a stator core fastened to the outer circumferential face of the first cylindrical part; and the stator core is disposed facing the inner circumferential face of the rotor magnet in the radial direction.

With the brushless motor of the present invention, the first sliding bearing is used as a main bearing and the second sliding bearing is used as an auxiliary bearing which, only when the rotary shaft is subjected to an excessive radial load, bears that load, whereby abnormal wear of the bearings and rotary shaft and twisting, due to misalignments between the two bearings, can be prevented, and deformation of the rotary shaft can be prevented.

BRIEF DESCRIPTION OF THE DRAWINGS

FIG. 4 consists of schematic views (a) and (b), serving to describe loads received by a worm gear from a worm wheel when the electric motor having the reduction mechanism in FIG. 3 is driven.

DETAILED DESCRIPTION OF THE PREFERRED EMBODIMENTS

In the present specification, the central axis 2 of a first sliding bearing 32 is the same as the vertical direction in the drawings, and upward in FIG. 1 to FIG. 9 is referred to simply as "upward" while downward in FIG. 1 to FIG. 9 is referred to simply as "downward." Note that, the upward and downward directions do not indicate positional relationships or directions, when the actual device is assembled. Furthermore, the direction parallel to the central axis 2 is referred to as the "axial direction," the radial direction having the central axis 2 as its center is referred to simply as the "radial direction," and the circumferential direction having the central axis 2 as its center is referred to simply as the "circumferential direction."

Hereinafter modes of embodiment of the present invention are illustratively described based on the drawings.

First Mode of Embodiment

Figure 1:
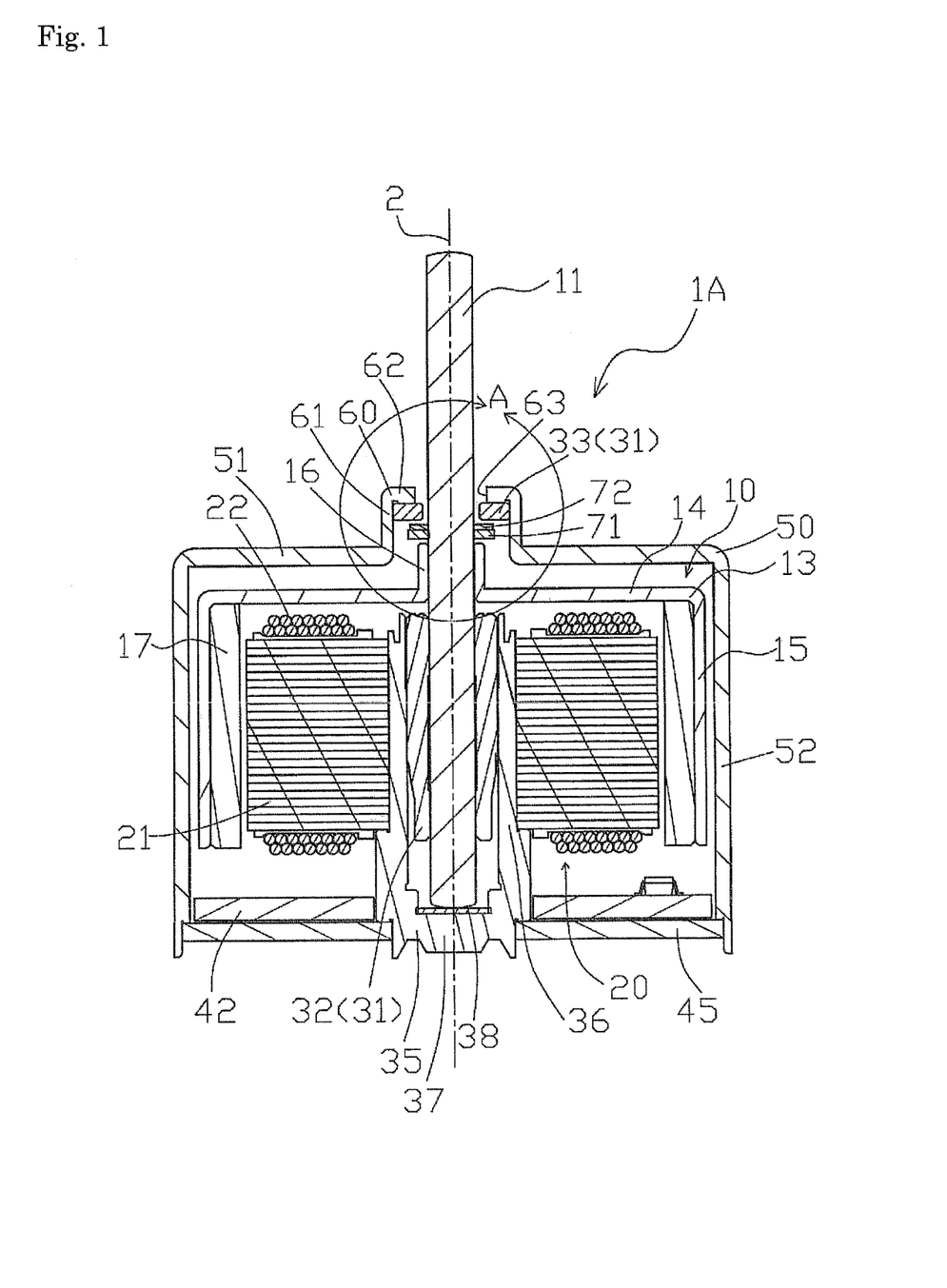
FIG. 1 is a sectional view of a brushless motor according to a first mode of embodiment of the present invention.
Figure 2:
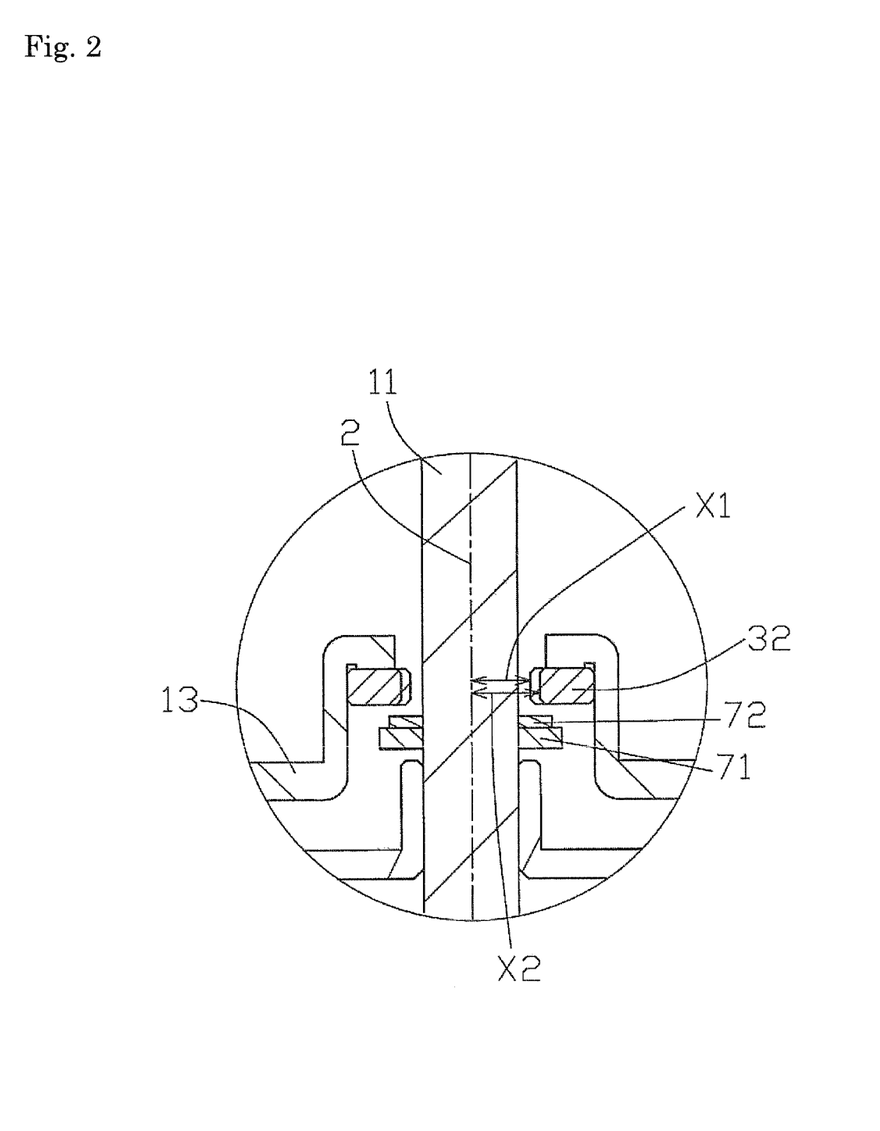
FIG. 2 is an enlarged view at the arrow A in FIG. 1.

The configuration of a brushless motor 1A according to a first mode of embodiment of the present invention is described by way of FIG. 1 and FIG. 2. In the first mode of embodiment, an outer-rotor type brushless motor 1A is described, which is covered by a cover member 50.

As shown in FIG. 1, the brushless motor 1A in this embodiment principally comprises a rotor 10, a rotary shaft 11, a stator 20, a bearing 31, a bearing holder 35, a retaining plate 45, and a cover member 50.

The rotor 10 comprises a rotor case 13 and a rotor magnet 17.

The stator 20 comprises a stator core 21 and coils 22.

The bearing 31 is a radial bearing that bears the radial force of the rotary shaft 11, and comprises a first sliding bearing 32 arranged at the bottom, and a second sliding bearing 33 arranged at the top. The first sliding bearing 32 and the second sliding bearing 33 are arranged so as not to touch each other. Note that an oil-impregnated sintered body, and oil-impregnated resin, or the like can be used for the first sliding bearing 32 and the second sliding bearing 33.

The first sliding bearing 32 is the main bearing, and this bearing alone can support the rotary shaft 11. That is to say, for example, when the brushless motor 1A is operating in a steady-state, radial loads applied to the rotary shaft 11 can be borne by the first sliding bearing 32 alone.

The second sliding bearing 33 is an auxiliary bearing that bears loads together with the first sliding bearing 32, when the rotary shaft 11 is subjected to an excessive radial load. Specifically, for example when the brushless motor 1A starts or stops, or when operating under an excessive load, the first sliding bearing 32 and the second sliding bearing 33 bear the radial load on the rotary shaft 11.

The first sliding bearing 32 and the second sliding bearing 33 form cylinders, with mutually different outer diameters, inner diameters and vertical lengths.

The outer diameter of the second sliding bearing 33 is greater than the outer diameter of the first sliding bearing 32. Furthermore, the inner diameter of the second sliding bearing 33 is greater than the inner diameter of the first sliding bearing 32. Furthermore, the vertical length of the second sliding bearing 33 is shorter than the vertical length of the first sliding bearing 32.

Furthermore, the inside upper and lower ends of the first sliding bearing 32 and the second sliding bearing 33 each form C-faces.

The bearing holder 35 is formed from a metallic material, and has a cylindrically shaped first cylindrical part 36 and a bottom 37, which closes the bottom end of the first cylindrical part 36. The first sliding bearing 32 is fastened to the inner circumferential face of a first cylindrical part 36. A thrust receiving member 38, which vertically supports the rotary shaft 11, is arranged on the top face of a bottom part 37.

The rotary shaft 11 is made from a hard material such as metal, and is an elongate cylindrical member formed with a uniform diameter, continuous from the top end to the bottom end. Both ends of the rotary shaft 11 are formed with rounded ends. The rotary shaft 11 supported, by the first sliding bearing 32 and the thrust receiving member 38, so as to be able to rotate around the central axis 2 of the first sliding bearing 32.

The thickness and the material of this rotary shaft 11 can be suitably established so that the rotary shaft 11 has a bending elastic modulus of no less than a predetermined value, in consideration for the radial load acting on the rotary shaft 11.

Note that the inner diameter of the first sliding bearing 32 is slightly greater than the outer diameter of the rotary shaft 11, such that a slight gap is formed between the inner circumferential face of the first sliding bearing 32 and the outer circumferential face of the rotary shaft 11. Because of this gap, when a radial load is applied to the rotary shaft 11, the rotary shaft 11 tilts slightly with respect to the first sliding bearing 32.

The rotor case 13 rotates united with the rotary shaft 11. The rotor case 13 has a cylindrically shaped second cylindrical part 15, and a top plate 14, which closes the top end of the second cylindrical part 15, a drive rotor magnet 17 being fastened on the inner circumferential face of the second cylindrical part 15. A burring part 16, produced by drawing, rises upward in the center of the top plate 14 of the rotor case 13, the rotary shaft 11 being fastened by press fitting into the burring part 16.

The stator 20 is arranged so as to face the rotor magnet 17 in the radial direction. Specifically, the stator 20 has a stator core 21 that is fastened to the outer circumferential face of the first cylindrical part 36 of the bearing holder 35, and is arranged so as to face the inner circumferential face of the rotor magnet 17 in the radial direction.

The stator core 21 is a core in which a plurality of core plates are laminated, and has a plurality of equidistant salient poles at the outer circumference thereof. Coils 22 are respectively wound on each of the salient poles. The stator core 21 serves to strengthen the magnetic flux when current is passed through the coils 22.

The rotor magnet 17 generates a rotary force in the rotor 10. This rotor magnet 17 is formed in the shape of a ring, and is alternatingly magnetized with North and South poles, in the circumferential direction.

The retaining plate 45 is formed from a metallic material in a plate shape, and is formed so as to extend radially from the bottom 37, which is part of the outer circumferential face of the bearing holder 35. The external profile of the retaining plate 45 is formed so as to be larger than the outer diameter of the rotor case 13, in the radial direction.

A wiring board 42, which supplies the coils 22 with externally applied electric power, is fastened to the top face of this retaining plate 45.

Furthermore, the retaining plate 45 and the wiring board 42 have through holes in the approximate centers thereof, having substantially the same circular form as the outer circumferential faces of the bearing holder 35, and the bottom 37 of the bearing holder 35 is fastened in these through holes.

The cover member 50 is formed from a hard material and covers the rotor 10 and the stator 20 from above. The cover member 50 has a cylindrically shaped third cylindrical part 52, and a cover part 51, which closes the top end of the third cylindrical part 52, and the bottom end of the third cylindrical part 52 is fastened to the outer circumference of the retaining plate 45. The cover member 50 prevents dust or the like from getting into the motor, by covering the rotor 10 and the stator 20 from above.

A cylindrically shaped part 60 is provided in the center of the cover part 51 of the cover member 50. This cylindrically shaped part 60 has a cylinder 61 and an end plate 62 provided at the top end of the cylinder 61, and protrudes upward from the cover part 51, united with the cover member 50.

A through hole 63 is formed in the center of the end plate 62. That is to say, the through hole 63 is provided in the center of the cover part 51 of the cover member 50. The diameter of this through hole 63 is formed larger than the inner diameter of the second sliding bearing 33, and smaller than the outer diameter of the second sliding bearing 33. Note that the through hole 63 and the second sliding bearing 33 are coaxially arranged.

The entire second sliding bearing 33 is inserted into the cylindrically shaped part 60 and fastened. The top face of the second sliding bearing 33 makes contact with the bottom face of the end plate 62, and the outer circumferential face of the second sliding bearing 33 is in contact with the inner circumferential face of the cylinder 61.

Furthermore, the rotary shaft 11 protrudes upward from the through hole 63 without contact with the end plate 62 or the second sliding bearing 33.

A first washer member 71, which is made from a hard material such as metal or resin, is fastened to the rotary shaft 11, between the top plate 14 of the rotor case 13 and the second sliding bearing 33.

This first washer member 71 is disposed without contact with the second sliding bearing 33. That is to say, the first washer member 71 is disposed with a gap in the vertical direction between the first washer member 71 and the second sliding bearing 33. This first washer member 71 is provided so as to reduce variation in thrust play. In the present specification, thrust play refers to the distance that the rotary shaft 11 can move in the upward direction (axial direction).

Furthermore, the first washer member 71 is disposed without contact with the top end of the burring part 16. That is to say, the first washer member 71 is disposed with a gap in the vertical direction between the first washer member 71 and the rotor case 13.

A part having flat faces that have high degrees of flatness on the top face and the bottom face, the part being formed so that the external profile is circular, for example, by press working a thin flat piece of metal, is suitable for use as the first washer member 71.

The outer diameter of the first washer member 71 is formed larger than the inner diameter of the second sliding bearing 33, and smaller than the outer diameter of the second sliding bearing 33. Furthermore, the outer diameter of the first washer member 71 is formed larger than the outer diameter of the burring part 16.

Furthermore, the inner diameter of the first washer member 71 is formed slightly smaller than the outer diameter of the rotary shaft 11. When the first washer member 71 has been fastened by way of press fitting on the rotary shaft 11, the first washer member 71 rotates united with the rotary shaft 11. The first washer member 71 is enclosed by the cylindrically shaped part 60, and disposed without contact with the inner circumferential face of the cylinder 61.

Furthermore, a second washer member 72, which is made of a soft material, is fastened to the rotary shaft 11, between the first washer member 71 and the second sliding bearing 33, and rotates united with the rotary shaft 11.

This second washer member 72 is provided in order to limit impact noise when the rotary shaft 11 has moved upward.

The second washer member 72 is one wherein a thin flat plate made from resin is pressed worked so as to form the external profile into a circular shape, and has flat faces with high degrees of flatness on the top and bottom faces.

The outer diameter of the second washer member 72 is formed smaller than the outer diameter of the first washer member 71, and larger than the inner diameter of the second sliding bearing 33.

The inner diameter of the second washer member 72 is formed substantially the same as the outer diameter of the rotary shaft 11. When the second washer member 72 is assembled on the rotary shaft 11, the second washer member 72 is arranged in contact with the top face of the first washer member 71, and the second washer member 72 rotates united with the rotary shaft 11 and the first washer member 71. Furthermore, the second washer member 72 is enclosed by the cylindrically shaped part 60, and disposed without contact with the inner circumferential face of the cylinder 61. Furthermore, the second washer member 72 is disposed without contact with the second sliding bearing 33. That is to say, the second washer member 72 is disposed with a gap in the vertical direction between the second washer member 72 and the second sliding bearing 33.

Next, the method of assembling the brushless motor 1A in this mode of embodiment will be described.

The rotary shaft 11, the rotor case 13, the first washer member 71, the second washer member 72 and the rotor magnet 17 are prepared.

First, the rotary shaft 11 is fastened by way of press fitting into the burring part 16 of the rotor case 13. The rotor magnet 17 is fastened, from the bottom, to the inner circumferential face of the second cylindrical part 15 of the rotor case 13 that is fastened to the rotary shaft 11 (resulting in a rotor 10 having a rotary shaft 11). Then, the first washer member 71 is press fit onto the rotary shaft 11, from above the rotary shaft 11, which is fastened in the rotor case 13, by pressing the top face of the first washer member 71, so that the first washer member 71 does not make contact with the burring part 16 of the rotor case 13. Further, by pressing down on the top face of the second washer member 72, the second washer member 72 is brought into contact with the top face of the first washer member 71 from above the rotary shaft 11 (resulting in a first assembly).

Next, the stator core 21, the coils 22, the first sliding bearing 32, the bearing holder 35, the thrust receiving member 38, the wiring board 42 and the retaining plate 45 are prepared.

First, the coils 22 are wound on to the salient poles of the stator core 21 (resulting in a stator 20). Next, the thrust receiving member 38 is disposed on the bottom 37 of the individual bearing holder 35. Then, the first sliding bearing 32 is press fit into the opening in the bearing holder 35 so as to be fastened to the inner circumferential face of the bearing holder 35. Next, the stator 20 is fastened, from above, to the outer circumferential face of the first cylindrical part 36 of the bearing holder 35. Next, the retaining plate 45 having the wiring board 42 is fastened to the bottom 37 of the bearing holder 35 (resulting in a second assembly).

Next, the second sliding bearing 33 and the cover member 50 are prepared.

The second sliding bearing 33 is fastened from below on the cylindrically shaped part 60 of the cover member 50 (resulting in a third assembly).

Next, the rotary shaft 11 of the first assembly is inserted from above into the first sliding bearing 32 in the second assembly, whereby the first assembly and the second assembly are assembled with the rotary shaft 11 supported by the first sliding bearing 32. In this state, the cover member 50 of the third assembly covers the rotor 10 and the stator 20, and the bottom end of the third cylindrical part 52 of the cover member 50 is fastened to the outer circumference of the retaining plate 45. Consequently, the rotary shaft 11 protrudes upward from the cover member 50, and a brushless motor 1A results.

When this brushless motor 1A is provided with electrical power from the wiring board 42, the stator core 21 on which the coils 22 are wound is excited, whereby the rotor magnet 17 is subjected to force, and the rotor 10 can rotate.

Figure 3:
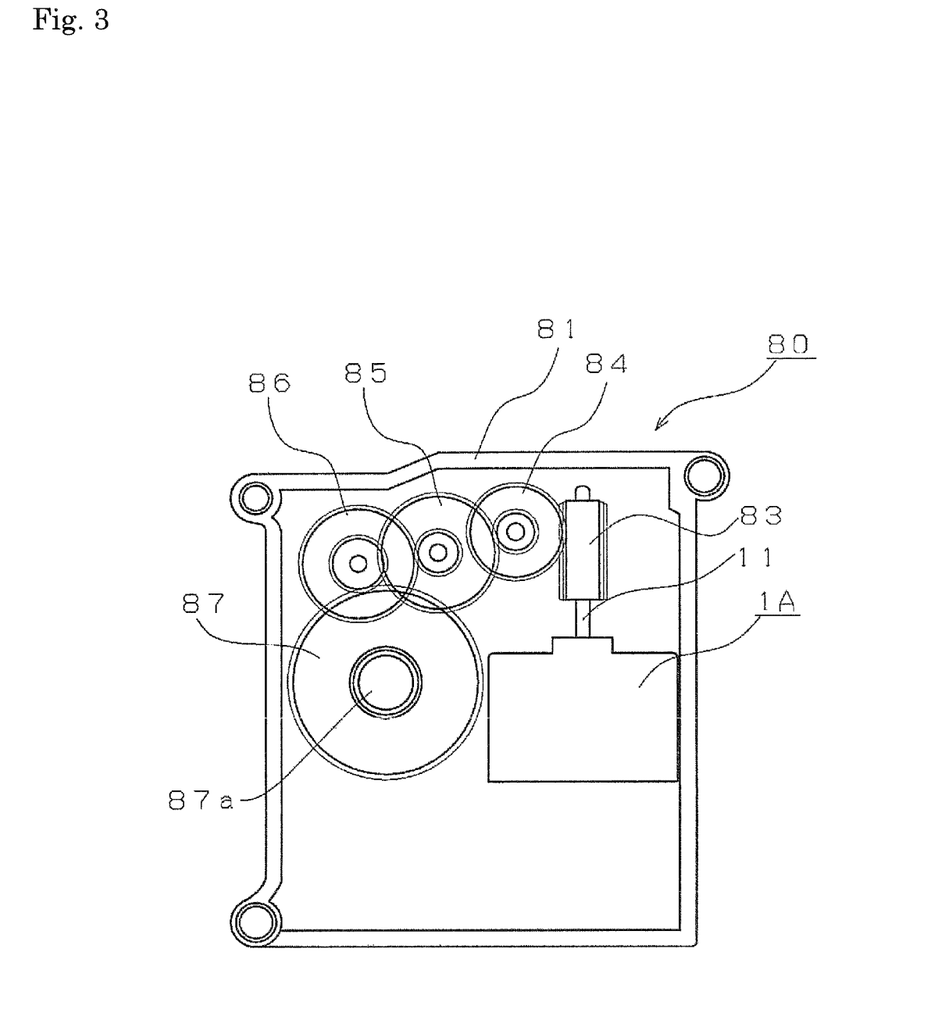
FIG. 3 is a view schematically illustrating the interior of an electric motor having a reduction mechanism to which the brushless motor in FIG. 1 has been applied.

The brushless motor 1A can be incorporated into an electric motor 80 provided with a reduction mechanism, as shown in FIG. 3. Note that this electric motor 80 provided with a reduction mechanism can be used, for example, as a device for feeding bills that have been inserted into a vending machine into a bill transport path.

In the electric motor 80 provided with a reduction mechanism, a substantially cubic box is formed by a lower case 81 and a non-illustrated upper case, at the interior of which housed: the brushless motor 1A of this example; and a reduction gear train comprising a worm gear 83, a first intermediate gear (worm wheel) 84, a second intermediate gear 85, a third intermediate gear 86, and an output gear 87 having an output shaft 87a. Note that, while not illustrated in FIG. 3, a circuit board is housed within this case, on which a motor drive circuit and a circuit for detecting the rotation of the reduction gears and the like are mounted.

The worm gear 83 is mounted by press fitting, bonding or the like on the rotary shaft 11. A force F (load) acts in the places where this worm gear 83 meshes with the worm wheel 84, when the motor rotates, as shown in FIG. 4(a) and FIG. 4(b).

Figure 4:
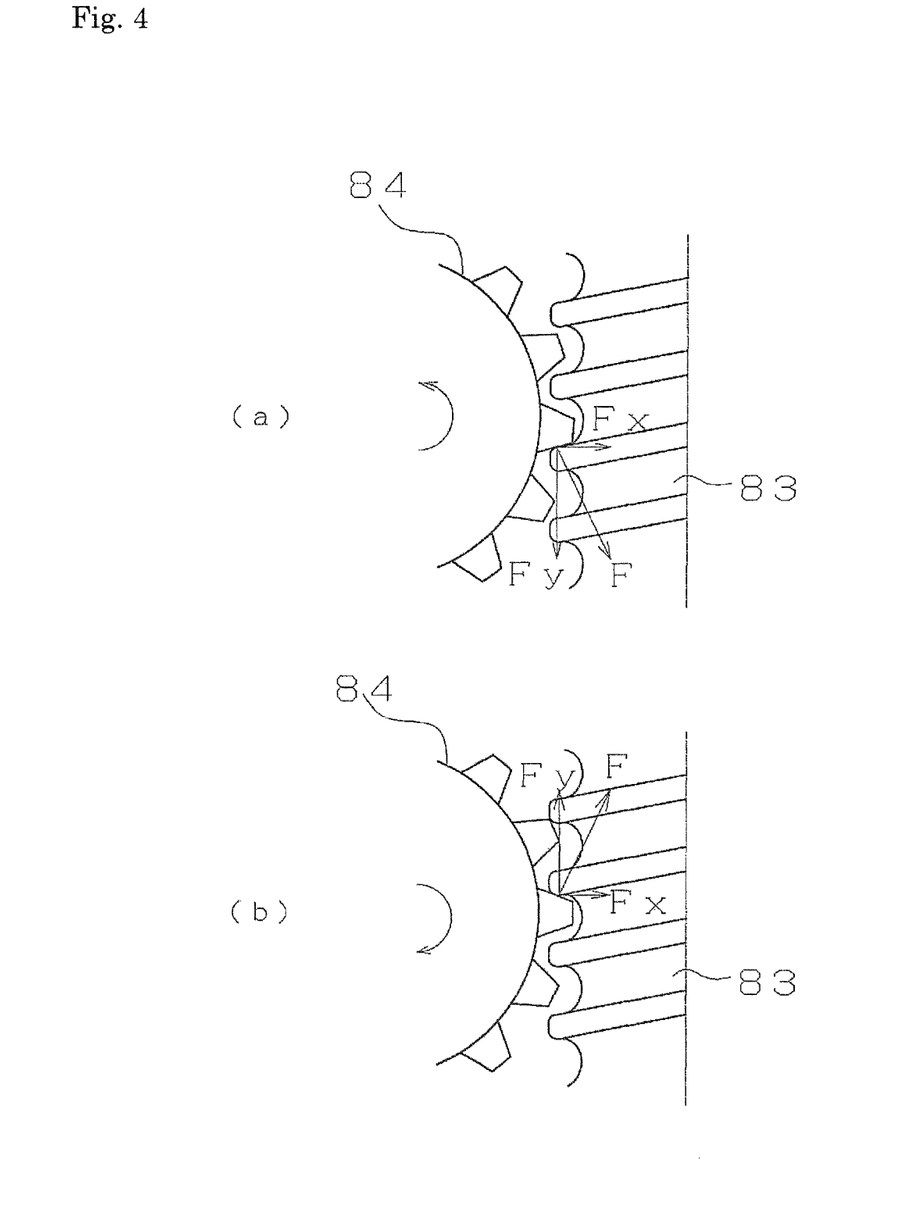

When the worm wheel 84 is rotated counterclockwise by the brushless motor 1A as shown in FIG. 4(a) and when worm wheel 84 is rotated clockwise as shown in FIG. 4(b), the radial load Fx, which is the radial component of the force F, acts as force with which the worm wheel 84 pushes the worm gear 83 to the right, as drawn in FIG. 4.

Thus, the rotary shaft 11 is tilted slightly to the right, as drawn in FIG. 4, and the rotary shaft 11 forms a predetermined angle of inclination with respect to the central axis 2 of the first sliding bearing 32.

In the brushless motor 1A of this embodiment, in a state where the angle of inclination of the rotary shaft 11 in the first sliding bearing 32 is not maximal, the rotary shaft 11 is supported only by the first sliding bearing 32, without the rotary shaft 11 contacting the inside of the second sliding bearing 33. The overall rotary shaft 11 is not deformed at this time.

In the present specification, "the angle of inclination of the rotary shaft 11 in the first sliding bearing 32" refers to the angle between the portion of the rotary shaft 11 that is located within the first sliding bearing and the central axis 2 of the first sliding bearing 32.

If a radial load of a predetermined magnitude is applied to the rotary shaft 11, the rotary shaft 11 makes contact with the inside top end and the inside bottom end of the first sliding bearing 32, and the angle of inclination of the rotary shaft 11 in the first sliding bearing 32 will be maximal.

Furthermore, if an excessive radial load, which exceeds a predetermined value, is applied to the rotary shaft 11, the rotary shaft 11 will make contact with the inside of the second sliding bearing 33, as a result of being slightly deformed in the radial direction, such that the radial load will be borne by the first sliding bearing 32 and the second sliding bearing 33. At this time, while the upper end of the rotary shaft 11 is bent to the right, as drawn in FIG. 1, because there is little difference between the inner diameter of the first sliding bearing 32 and the outer diameter of the rotary shaft 11, the rotary shaft 11 is substantially not deformed in that portion that is within the first sliding bearing 32.

In the brushless motor 1A in this example, the inner diameter of the second sliding bearing 33 is determined, with consideration for the bending elastic modulus of the rotary shaft 11, the point on which the radial load acts and the dimensional tolerances and assembly tolerances of each component, so that, when an excessive load from the radial direction is borne by the rotary shaft 11, the amount of deformation of the rotary shaft 11 when the rotary shaft 11 first makes contact with the second sliding bearing 33 is within the range of from 0 (zero) to the maximum elastic deformation.

Specifically, these are designed so that the shortest distance X from the central axis 2 of the first sliding bearing 32 to the inner circumferential face of the second sliding bearing 33 falls within the range of no less than X1 and no greater than X2, described below (see FIG. 2).

X1: The distance from the central axis 2 of the first sliding bearing 32 to the outer circumferential face of the rotary shaft 11 that faces the inner circumferential face of the second sliding bearing 33 in the radial direction, this being the outer circumferential face of the undeformed rotary shaft 11 (in a state where the angle of inclination of the rotary shaft in the first sliding bearing 32 is maximal).

X2: The distance from the central axis 2 of the first sliding bearing 32 to the outer circumferential face of the rotary shaft 11 that faces the inner circumferential face of the second sliding bearing 33 in the radial direction, this being the outer circumferential face of the maximally elastically deformed rotary shaft 11 (in a state where the angle of inclination of the rotary shaft in the first sliding bearing 32 is maximal).

Note that, in the present specification, "maximum elastic deformation" refers to the maximum amount of deformation in the bending stress-strain curve of the rotary shaft 11, in the elastic deformation region, when a radial load (bending stress) is applied to the rotary shaft 11.

When the shortest distance X is equal to the aforementioned X1, in a state where the rotary shaft 11 is not deformed, the rotary shaft 11 makes contact with the inside top end and the inside bottom end of the first sliding bearing 32, while also making contact with the inside of the second sliding bearing 33, and thus the rotary shaft 11 is supported by the first sliding bearing 32 and the second sliding bearing 33.

Furthermore, when the shortest distance X is equal to the aforementioned X2, the rotary shaft 11 makes contact with the inside top end and the inside bottom end of the first sliding bearing 32 while, under maximum elastic deformation, the rotary shaft 11 also makes contact with the inside of the second sliding bearing 33, thus the rotary shaft 11 is supported by the first sliding bearing 32 and the second sliding bearing 33.

Accordingly, by configuring this so that the shortest distance X falls within the range of no less than X1 and no greater than X2, the upper portion of the rotary shaft 11 can be supported by the second sliding bearing 33, before the amount of deformation of the rotary shaft 11 exceeds the maximum elastic deformation, allowing plastic deformation of the rotary shaft to be avoided.

However, if the shortest distance X were less than the aforementioned X1, the rotary shaft 11 would make contact with the inside of the second sliding bearing 33, even when the angle of inclination of the rotary shaft 11 in the first sliding bearing 32 was not maximal. Consequently, the rotary shaft 11 would be in sliding contact with the second sliding bearing 33, which has a lower oil content than the first sliding bearing 32, even when the brushless motor 1A was running in a steady-state, which would tend to reduce the durability of the motor.

Furthermore, if the shortest distance X were to exceed the aforementioned X2, when the rotary shaft 11 was subjected to an excessive radial load such that the rotary shaft 11 exceeded the maximum elastic deformation, the rotary shaft 11 would plastically deform, such that the rotary shaft 11 would not return to its original shape, even after the radial load had been removed, and force would not be efficiently transmitted from the worm gear 83 to the worm wheel 84.

When the rotor 10 turns in reverse so that the worm wheel 84 rotates counterclockwise, as drawn in FIG. 4(*a*), the load F acts on the worm gear 83 as shown in FIG. 4(*a*). In this case, the bottom end of the rotary shaft 11 makes contact with the thrust receiving member 38, as shown in FIG. 5 and FIG. 6.

Figure 5:
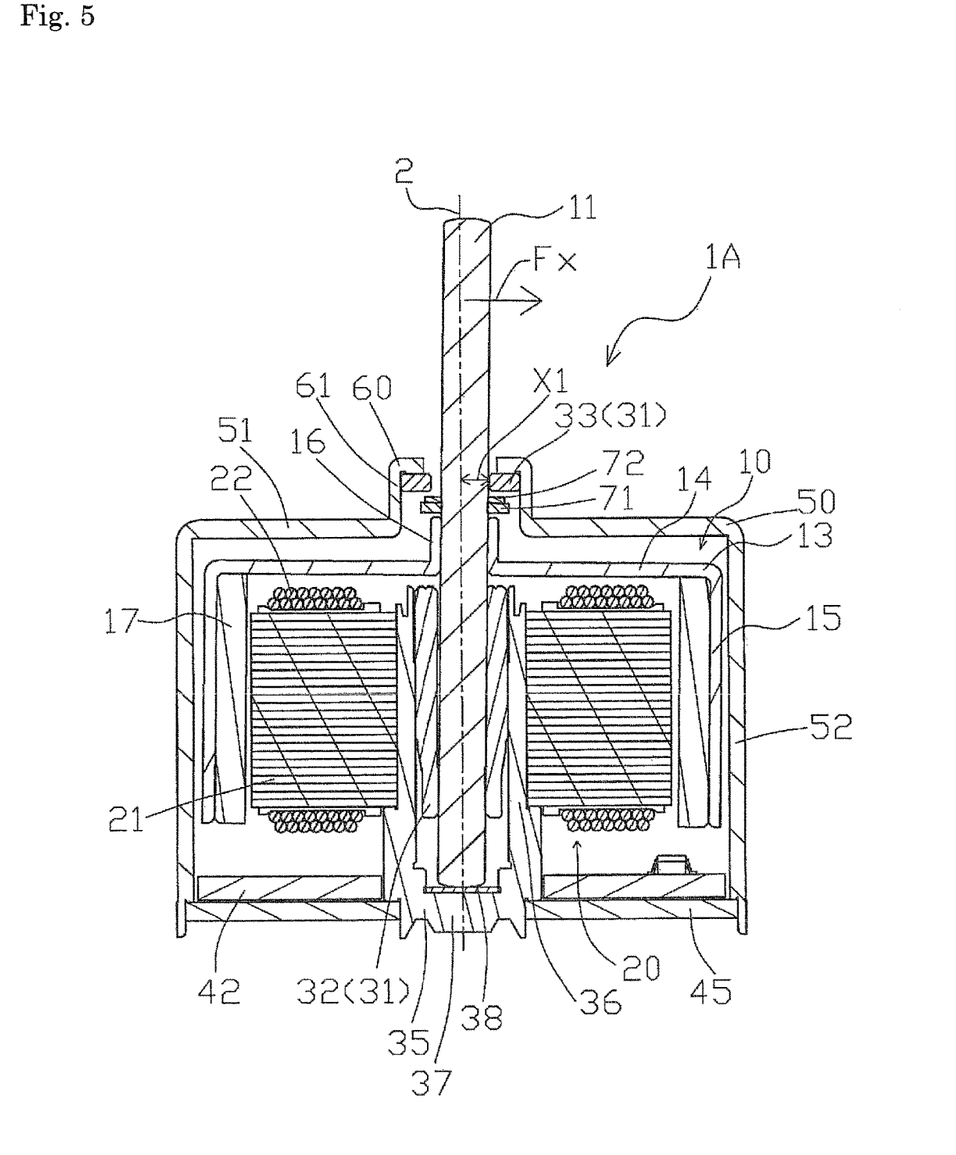
FIG. 5 is a first schematic sectional view of a brushless motor under the load in FIG. 4 (a).

FIG. 5 is a first schematic sectional view of the brushless motor 1A under the load in FIG. 4(*a*), illustrating a case in which the aforementioned X is X1. Specifically, this is a case in which the amount of deformation of the rotary shaft 11 is 0, when the rotary shaft 11 first makes contact with the second sliding bearing 33, such that the rotary shaft 11 is supported by the first sliding bearing 32 and the second sliding bearing 33, without the rotary shaft 11 deforming.

Figure 6:
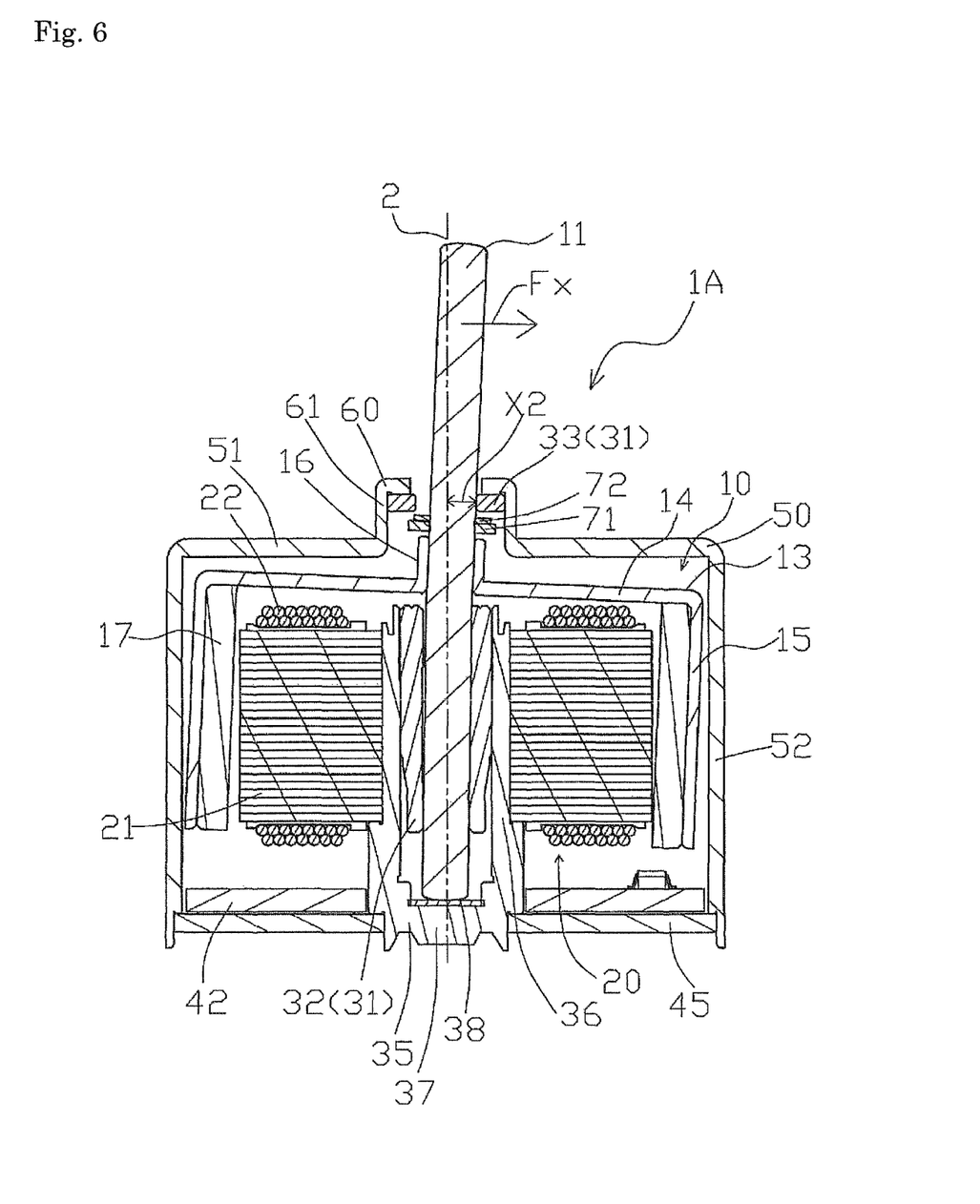
FIG. 6 is a second schematic sectional view of a brushless motor under the load in FIG. 4 (a).

Furthermore, FIG. 6 is a second schematic sectional view of the brushless motor 1A under the load in FIG. 4(*a*), illustrating a case in which the aforementioned X is X2. Specifically, this is a case in which the amount of deformation of the rotary shaft 11 when the rotary shaft 11 first makes contact with the second sliding bearing 33 is the maximum elastic deformation, such that the rotary shaft 11 is supported by the first sliding bearing 32 and the second sliding bearing 33 with the rotary shaft 11 maximally elastically deformed.

Next, when the rotor 10 turns in the forward direction, so that the worm wheel 84 rotates clockwise as drawn in FIG. 4(*b*), the load F acts on the worm gear 83 as shown in the FIG. 4(*b*). In this case, as shown in FIG. 7 and FIG. 8, the second washer member 72 will make contact with the second sliding bearing 33, and the bottom end of the rotary shaft 11 will not be in contact with the thrust receiving member 38.

Figure 7:
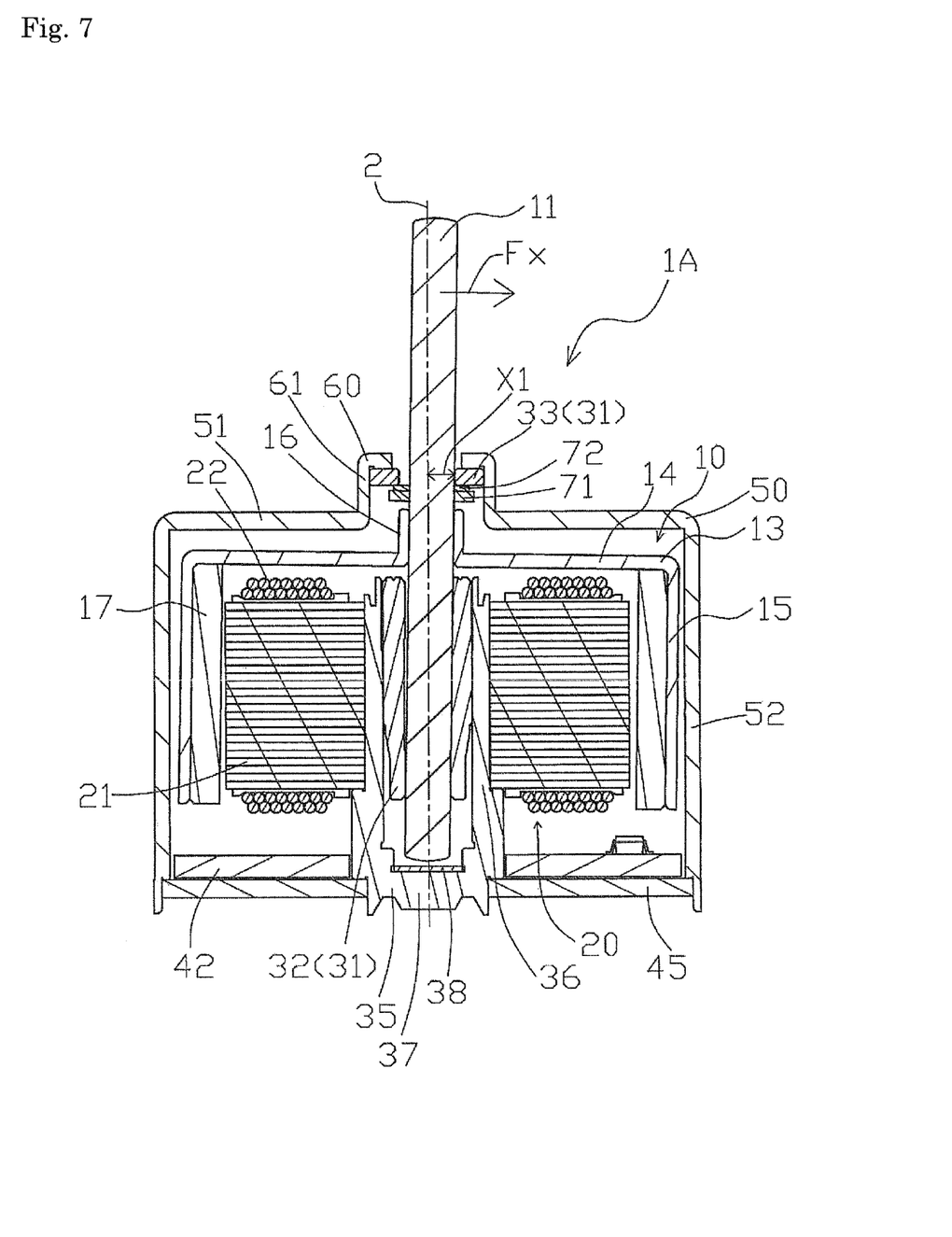
FIG. 7 is a first schematic sectional view of a brushless motor under the load in FIG. 4 (b).

FIG. 7 is a first schematic sectional view of the brushless motor 1A under the load in FIG. 4(*b*), illustrating a case in which the aforementioned X is X1. Specifically, this is a case in which the amount of deformation of the rotary shaft 11 is 0, when the rotary shaft 11 first makes contact with the second sliding bearing 33, such that the rotary shaft 11 is supported by the first sliding bearing 32 and the second sliding bearing 33, without the rotary shaft 11 deforming.

Figure 8:
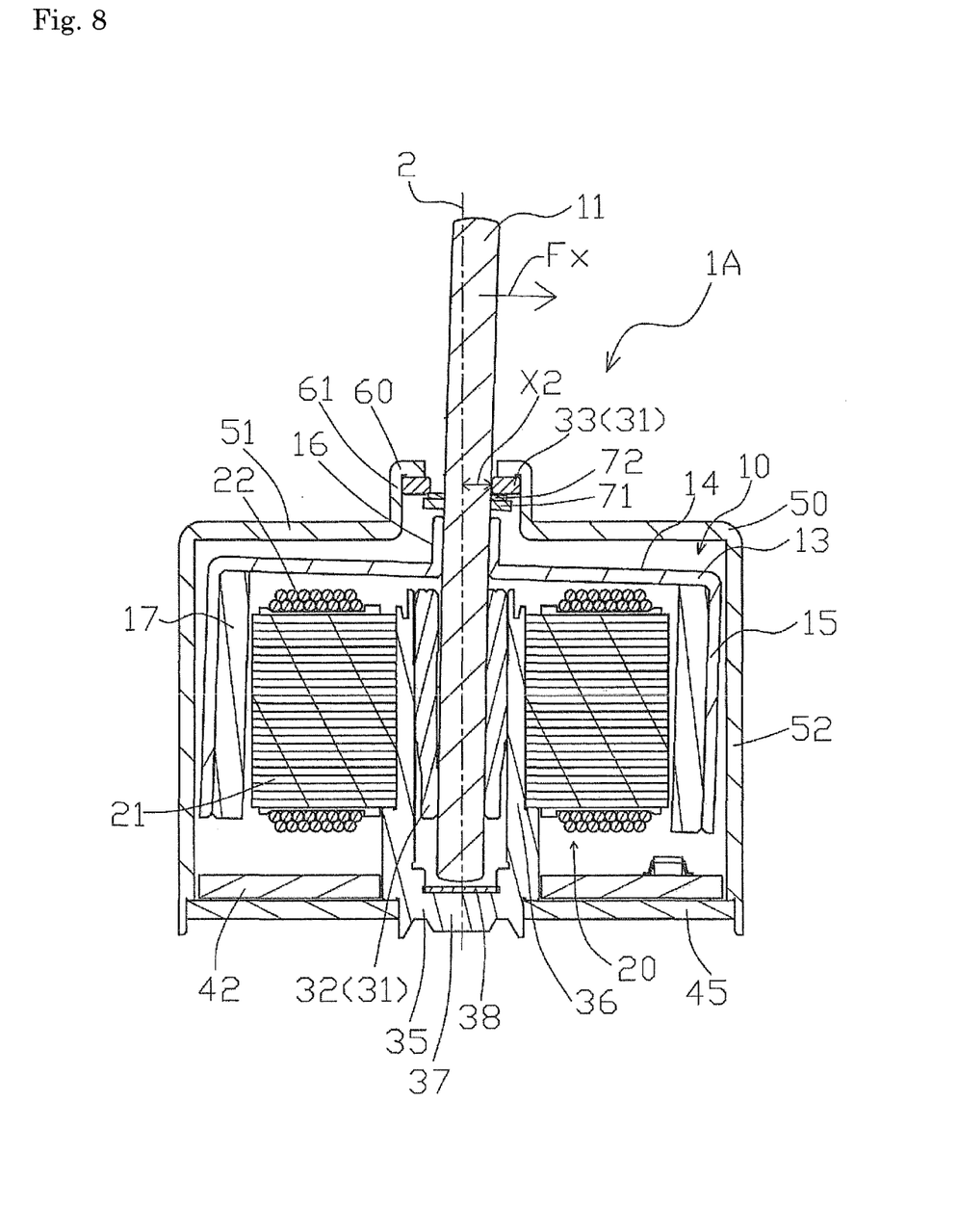
FIG. 8 is a second schematic sectional view of a brushless motor under the load in FIG. 4 (b).

Furthermore, FIG. 8 is a second schematic sectional view of the brushless motor 1A under the load in FIG. 4(*b*), illustrating a case in which the aforementioned X is X2. Specifically, this is a case in which the amount of deformation of the rotary shaft 11 when the rotary shaft 11 first makes contact with the second sliding bearing 33 is the maximum elastic deformation, such that the rotary shaft 11 is supported by the first sliding bearing 32 and the second sliding bearing 33, with the rotary shaft 11 maximally elastically deformed.

With such a brushless motor 1A of the present mode of embodiment, the first sliding bearing 32 functions as a main bearing, and the second sliding bearing 33 functions as an auxiliary bearing. Thus, in a state where the angle of inclination of the rotary shaft 11 in the first sliding bearing 32 is not maximal, the rotary shaft 11 is supported only by the first sliding bearing 32, without the rotary shaft 11 contacting the inside of the second sliding bearing 33. Furthermore, this is designed so that when the rotary shaft 11 is subjected to an excessive load from the radial direction and the rotary shaft 11 first makes contact with the second sliding bearing 33, the amount of deformation of the rotary shaft 11 will be within a range from 0 to the maximum elastic deformation.

Consequently, with the brushless motor 1A of the present mode of embodiment, because the rotary shaft 11 is only in sliding contact with the first sliding bearing 32, in steady-state operation, it is possible to prevent abnormal wear of the bearings and the rotary shaft and twisting, which occur due to misalignment of the two bearings. Furthermore, when the rotary shaft 11 is subjected to an excessive radial load, the upper portion of the rotary shaft 11 is in sliding contact with the second sliding bearing 33 before the amount of deformation of the rotary shaft 11 exceeds the maximum elastic deformation, allowing deformation of the rotary shaft to be effectively prevented.

Furthermore, with the brushless motor 1A of the present mode of embodiment, the second sliding bearing 33 is the auxiliary bearing, and therefore the vertical length of the second sliding bearing 33 can be made shorter than the vertical length of the first sliding bearing 32, which is the main bearing. The vertical length of the second sliding bearing 33 can normally be established at $\frac{1}{5}$ or less of the vertical length of the first sliding bearing 32, or even $\frac{1}{10}$ or less thereof, allowing deformation of the rotary shaft to be prevented while keeping the overall motor height low.

Furthermore, with the brushless motor 1A of the present mode of embodiment, in a state where the angle of inclination of the rotary shaft 11 in the first sliding bearing 32 is maximal, the rotary shaft 11 makes contact with the inside top end of the first sliding bearing 32 and the inside bottom end of the first sliding bearing 32. Consequently, when the rotary shaft 11 is subjected to a radial load of a predetermined magnitude, the rotary shaft 11 can also be supported at the top end portion of the first sliding bearing 32 close to the point at which the radial load acts, allowing deformation of the rotary shaft to be effectively limited.

Furthermore, with the brushless motor 1A of the present mode of embodiment, when the rotary shaft 11 is subjected to an excessive load from the radial direction, the rotary shaft 11 makes contact with the inside top end of the second sliding bearing 33. Consequently, when the rotary shaft 11 is subjected to an excessive radial load, the rotary shaft 11 can also be supported at the top end portion of the second sliding bearing 32, even closer to the point at which the radial load acts, allowing deformation of the rotary shaft to be even more effectively prevented.

Furthermore, in the brushless motor 1A of this mode of embodiment, a first washer member 71, which is made from a hard material and has flat faces, is fastened to the rotary shaft 11, between the top plate 14 of the rotor case 13 and the second sliding bearing 33, this first washer member 71 being disposed without contact with the top plate 14 or the second sliding bearing 33.

Consequently, the first washer members 71 is fastened to the rotary shaft 11, without being impacted by the dimensional tolerance between the bottom end of the rotary shaft 11 and the top plate 14 of the rotor case 13. Further, because the first washer member 71 has a flat face having a high degree of flatness on the top face thereof, when fastened by press fitting onto the rotary shaft 11, the dimensional tolerance from the bottom end of the rotary shaft 11 to the top face of the first washer member 71 can be minimized. Accordingly, it is possible to limit variation in the gap between the first washer member 71 and second sliding bearing 33, and thus reduce variation in the thrust play.

Furthermore, with the brushless motor 1A of the present mode of embodiment, the second washer member 72, which is made from a soft material, and has flat faces, is provided on the rotary shaft 11 between the first washer member 71 and the second sliding bearing 33. This second washer member 72 is disposed without contact with the second sliding bearing 33.

Consequently, when the rotary shaft 11 moves upwards, the hard-material first washer member 71 does not come into contact with the second sliding bearing 33, but rather the second washer member 72, which is made from a soft material, comes into contact with the second sliding bearing 33, allowing for a reduction in the impact sound caused by thrust play.

Second Mode of Embodiment

Figure 9:
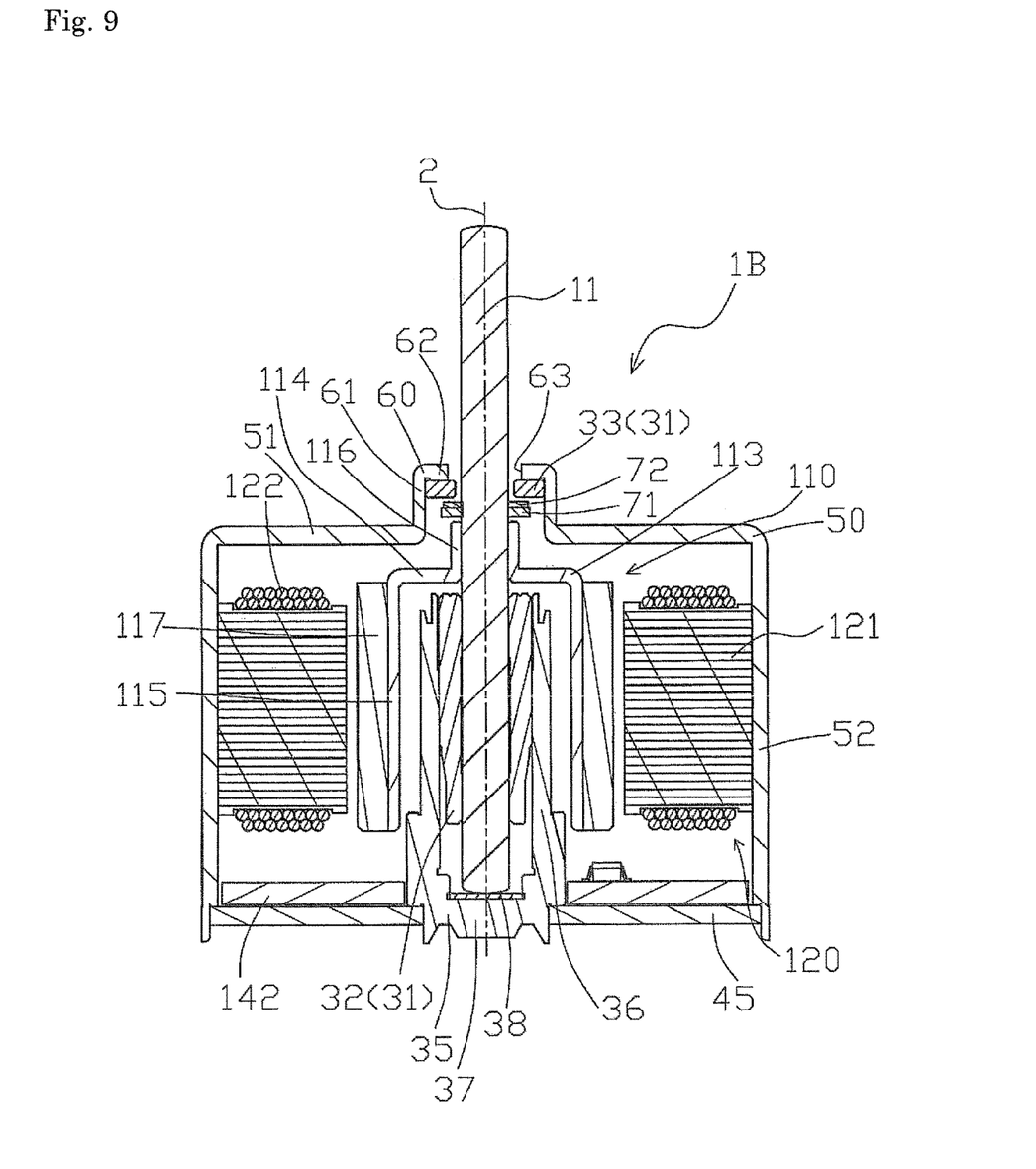
FIG. 9 is a sectional view of a brushless motor according to a second mode of embodiment of the present invention.

Next, the configuration of a brushless motor 1B according to a second mode of embodiment of the present invention is described by way of FIG. 9.

In FIG. 9, parts that are the same as parts in FIG. 1 to FIG. 8 are given the same reference numerals, and description of these parts is omitted.

The configuration of the rotor in the second mode of embodiment differs from that in the first mode of embodiment. That is to say, the first mode of embodiment was an outer-rotor type brushless motor, covered by a cover member 50, but in the second mode of embodiment, this is an inner-rotor type brushless motor covered by a cover member 50.

The first mode of embodiment comprised a rotor case 13 fastened to a rotary shaft 11; a rotor 10 having a rotor magnet 17 fastened to the inner circumferential face of the rotor case 13; and a stator 20 arranged facing the rotor magnet 17 in the radial direction.

Meanwhile, in the second mode of embodiment, this comprises a rotor case 113 fastened to a rotary shaft 11; a rotor 110 having a rotor magnet 117 fastened to the outer circumferential face of the rotor case 113; and a stator 120 arranged facing the rotor magnet 117 in the radial direction.

A burring part 116, which results from drawing, rises upward in the center of the top plate 114 of the rotor case 113.

Next, the method of assembling the brushless motor 1B will be described.

The rotary shaft 11, the rotor case 113, the first washer member 71, the second washer member 72 and the rotor magnet 117 are prepared.

First, the rotary shaft 11 is fastened by way of press fitting into the burring part 116 of the rotor case 113. The rotor magnet 117 is fastened to the outer circumferential face of the second cylindrical part 115 of the rotor case 113 that is fastened to the rotary shaft 11 (resulting in a rotor 110 having a rotary shaft 11). Then, the first washer member 71 is press fit from above onto the rotary shaft 11 on which the rotor case 113 has been fastened, so as not to contact the burring part 116 of the rotor case 113. Furthermore, the second washer member 72 is fitted on the rotary shaft 11 from above the rotary shaft 11 on which the rotor case 113 has been fastened, and the second washer member 72 makes contact with the top face of the first washer member 71 (resulting in a fourth assembly).

Next, the first sliding bearing 32, the bearing holder 35, the thrust receiving member 38, the wiring board 142 and the retaining plate 45 are prepared.

First, the thrust receiving member 38 is disposed on the top face of the bottom 37 of the bearing holder 35. Then, the first sliding bearing 32 is press fit into the bearing holder 35 so as to be fastened to the inner circumferential face of the bearing holder 35. Then, the retaining plate 45 having the wiring board 142 is fastened to the bottom 37 of the bearing holder 35 (resulting in a fifth assembly).

Next, the second sliding bearing 33, the stator core 121, the coils 122 and the cover member 50 are prepared.

The coils 122 are wound on to the salient polls of the stator core 121 (resulting in a stator 120). The second sliding bearing 33 is fastened to the cylindrically shaped part 60 of the cover member 50. The stator 120 is fastened, from below, to the inner circumferential face of the third cylindrical part 52 of the cover member 50 (resulting in a sixth assembly).

Next, the rotary shaft 11 in the fourth assembly is inserted from above into the first sliding bearing 32 in the fifth assembly, so that the rotary shaft 11 is supported by the first sliding member 32. In this state, the cover member 50 of the sixth assembly covers the rotor 110 and the stator 120 from above, and the bottom edge of the third cylindrical part 52 of the cover member 50 is fastened to the outer circumference of the retaining plate 45 of the fifth assembly, resulting in a brushless motor 1B.

The second mode of embodiment has a similar operational effect to that of first mode of embodiment, and because an inner rotor is used, the startup time can be reduced as compared to using an outer rotor.

Modes of embodiment of the present invention have been described above, but the present invention is not limited to the modes of embodiment described above, and various modifications are possible.

Specifically, in the foregoing description, the rotary shaft 11 was an elongate cylindrical member formed with a uniform diameter, continuous from the top end to the bottom end, but there is no limitation to this, and it suffices that the rotary shaft 11 that faces the inside of the first sliding bearing 32 and the inside of the second sliding bearing 33 at least has a cylindrical shape, while the rotary shaft 11 that protrudes upward from the second sliding bearing 33 may be formed with a noncircular sectional shape (D cut or the like) for mounting the worm gear 83.

Furthermore, in the foregoing description, the second bearing 33 was a cylinder, and in a state in which the angle of inclination of the rotary shaft 11 in the first sliding bearing 32 is maximal, the rotary shaft 11 was supported by the inside top end of the second sliding bearing 33, but there is no limitation to this. The inside of the second sliding bearing may be formed in the shape of a truncated cone, in which the top circle is larger than the bottom circle so that, in a state in which the angle of inclination of the rotary shaft 11 in the first sliding bearing 32 is maximal, the rotary shaft 11 makes contact with the entire inside face of the second sliding bearing.

Furthermore, in the foregoing description, the rotary shaft 11 was an elongate cylindrical member formed with a uniform diameter, continuous from the top end to the bottom end, and the radial gap between the second sliding bearing 33 and the rotary shaft 11 was formed larger than the radial gap between the first sliding bearing 32 and the rotary shaft 11, but there is no limitation to this. The radial gap between the second sliding bearing 33 and the rotary shaft 11 may be formed larger than the radial gap between the first sliding bearing 32 and the rotary shaft 11.

For example, the inner diameter of the first sliding bearing 32 and the inner diameter of the second sliding bearing 33 may be the same. In this case, the outer diameter of the rotary shaft facing the inside of the second sliding bearing 33 is formed smaller than the outer diameter of the rotary shaft facing the inside of the first sliding bearing 32. Thus, the same operational effect as in the mode of embodiment described above can be produced.

Furthermore, in the foregoing description, a cylindrically shaped part 60 having an end plate 62 was formed in the center of the cover part 51 of the cover member 50, but this may be a cylindrically shaped part without an end plate 62, so long as the second sliding bearing 33 can be retained.

Furthermore, in the foregoing description, the outer diameters of the first washer member 71 and the second washer member 72 were formed so as to be circular, but there is no limitation to this and, for example, the external profiles of the first washer member 71 and the second washer member 72 may also be polygonal or elliptical.

Furthermore, in the foregoing description, the inner diameter of the second washer member 72 was formed substantially the same as the outer diameter of the rotary shaft 11, but the inner diameter of the second washer member 72 may be formed slightly larger than the outer diameter of the rotary shaft 11, and the second washer member 72 may be arranged so as to be able to rotate, with respect to the rotary shaft 11.

Furthermore, in the foregoing description, the second washer member 72 was arranged on the rotary shaft 11, between the first washer member 71 and the second sliding bearing 33, but the first washer member 71 may be placed in direct contact with the second sliding bearing 33 when the rotary shaft 11 moves upward, without arranging the second washer member 72 thereon.

Furthermore, in the foregoing description, the first washer member 71 and the second washer member 72 were arranged on the rotary shaft 11, between the top plate 14, 114 of the rotor case 13, 113 and the second sliding bearing 33, but the configuration may also be such that the burring part 16, 116 makes direct contact with the second sliding bearing 33, when the rotary shaft 11 moves upward, without arranging the first washer member 71 or the second washer member 72.

Furthermore, in the foregoing description, the burring part 16, 116 rose upward from the center of the top plate 14, 114, but the burring part 16, 116 may descend downward from the center of the top plate 14, 114.

Note that the cover part 51 of the cover member 50 serves as the mounting face when mounting the brushless motor 1A, 1B to a paper money transport device in a vending machine, for example, and screw holes (not illustrated) for mounting are provided in the cover part 51 of the cover member 50.

What is claimed is:

1. A brushless motor comprising:
   a bearing holder, which has a first cylindrical part and a bottom that closes the bottom end of the first cylindrical part;
   a first sliding bearing fastened to an inner circumferential face of the first cylindrical part;
   a rotary shaft supported so as to be able to rotate around the central axis of the first sliding bearing;
   a rotor having a rotor case, which is fastened to the rotary shaft and has a second cylindrical part and a top plate that closes the top end of the second cylindrical part, and a rotor magnet fastened to a circumferential face of the second cylindrical part;
   a stator, arranged so as to face the rotor magnet in the radial direction;
   a retaining plate that extends radially outward from said bottom; and
   a cover member, which has a third cylindrical part and a cover part that closes the top end of the third cylindrical part, the bottom end of the third cylindrical part being fastened to the retaining plate, so as to cover the rotor and the stator; and
   a second sliding bearing,
   wherein:
   the cover member has a cylinder in the center of the cover part;
   the second sliding bearing is fastened to the cylinder;
   the rotary shaft protrudes upward from the cylinder;
   the first sliding bearing is a main bearing;
   the second sliding bearing is an auxiliary bearing which, when the rotary shaft is subjected to an excessive load from the radial direction, bears the load together with the first sliding bearing;
   the rotary shaft is not in contact with the second sliding bearing in a state where the angle of inclination of the rotary shaft in the first sliding bearing is not maximal; and
   the amount of deformation of the rotary shaft when the rotary shaft receives an excessive load from the radial direction and the rotary shaft first makes contact with the second sliding bearing is in a range from 0 to the maximum elastic deformation.

2. The brushless motor according to claim 1, wherein:
the vertical length of the second sliding bearing is shorter than the vertical length of the first sliding bearing.

3. The brushless motor according to claim 2, wherein:
the rotary shaft makes contact with the inside top end and inside bottom end of the first sliding bearing, in a state where the angle of inclination of the rotary shaft is maximal.

4. The brushless motor according to claim 3, wherein
the rotary shaft makes contact with the inside top end of the second sliding bearing when the rotary shaft is subjected to an excessive load from the radial direction.

5. The brushless motor according to claim 4, wherein:
a first washer member, which is made from a hard material and has a flat face, is fastened to the rotary shaft, between the top plate and the second sliding bearing; and
the first washer member is disposed without contact with the top plate or the second sliding bearing.

6. The brushless motor according to claim 5, wherein
a second washer member, which is made from a soft material and has a flat face, is provided on the rotary shaft, between the first washer member and the second sliding bearing; and
the second washer member is disposed without contact with the second sliding bearing.

7. The brushless motor according to claim 6, wherein:
the rotor magnet is fastened to the inner circumferential face of the second cylindrical part;
the stator has a stator core fastened to the outer circumferential face of the first cylindrical part; and
the stator core is disposed facing the inner circumferential face of the rotor magnet in the radial direction.

* * * * *